United States Patent
Nishino et al.

(10) Patent No.: US 8,163,817 B2
(45) Date of Patent: *Apr. 24, 2012

(54) AQUEOUS INK, INK SET, IMAGE FORMING METHOD AND IMAGE FORMING APPARATUS

(75) Inventors: Yuuki Nishino, Tokyo (JP); Hiroyuki Takuhara, Yaita (JP); Mikio Sanada, Kawasaki (JP); Daiji Okamura, Yokohama (JP); Kenji Moribe, Fujisawa (JP); Satoshi Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 12/115,148

(22) Filed: May 5, 2008

(65) Prior Publication Data

US 2008/0280041 A1 Nov. 13, 2008

(30) Foreign Application Priority Data

May 11, 2007 (JP) ................................. 2007-126630
Apr. 23, 2008 (JP) ................................. 2008-112756

(51) Int. Cl.
*B41J 2/01* (2006.01)
*B41J 2/17* (2006.01)
*B41J 2/175* (2006.01)
*C08G 73/10* (2006.01)
*C08J 3/00* (2006.01)
*C08K 3/00* (2006.01)
*C08K 5/06* (2006.01)
*C09D 5/00* (2006.01)
*C09D 11/00* (2006.01)
*C09J 7/02* (2006.01)
*G01D 11/00* (2006.01)
*H01B 1/12* (2006.01)

(52) U.S. Cl. ................ 523/160; 347/1; 347/85; 347/86; 347/95; 347/100; 523/161; 524/366; 524/376; 524/401

(58) Field of Classification Search .................. 523/160, 523/161; 524/366, 376, 401; 347/1, 85, 347/86, 95, 96, 100

See application file for complete search history.

(56) References Cited

U.S. PATENT DOCUMENTS

| 4,723,129 | A | 2/1988 | Endo et al. ..................... 346/1.1 |
| 4,740,796 | A | 4/1988 | Endo et al. ..................... 346/1.1 |
| 6,435,658 | B1 | 8/2002 | Kato et al. ........................ 347/43 |
| 6,540,329 | B1 | 4/2003 | Kaneko et al. .................. 347/43 |
| 6,932,465 | B2 * | 8/2005 | Nito et al. ........................ 347/96 |
| 2003/0196568 | A1 | 10/2003 | Miyamoto et al. |
| 2004/0104986 | A1 | 6/2004 | Nito et al. |
| 2008/0018722 | A1 | 1/2008 | Mafune et al. ................. 347/100 |
| 2008/0280044 | A1 * | 11/2008 | Okamura et al. ............. 427/258 |

FOREIGN PATENT DOCUMENTS

| CN | 1493465 A | 5/2004 |
| EP | 0 739 743 A1 | 10/1996 |
| EP | 1253187 A2 | 10/2002 |
| EP | 1 400 364 A1 | 3/2004 |
| JP | 8-239610 | 9/1996 |
| JP | 2001-150793 | 6/2001 |
| JP | 2001-152059 | 6/2001 |
| JP | 2002-154263 | 5/2002 |
| JP | 2004-106299 | 4/2004 |
| JP | 2004-115549 | 4/2004 |

OTHER PUBLICATIONS

May 11, 2010 Chinese Official Action in Chinese Patent Application No. 200810097368.9 (with translation).
Sep. 30, 2008 European Search Report in European Patent Application No. 08155984.

* cited by examiner

*Primary Examiner* — Patrick Niland

(74) *Attorney, Agent, or Firm* — Fitzpatrick, Cella, Harper & Scinto

(57) ABSTRACT

An aqueous ink to be used together with a pigment ink containing a pigment and a polymer, wherein the aqueous ink contains a reactive component for destabilizing the dispersion state of the pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

9 Claims, 2 Drawing Sheets

AQUEOUS INK, INK SET, IMAGE FORMING METHOD AND IMAGE FORMING APPARATUS

BACKGROUND OF THE INVENTION

1. Field of the Invention

The present invention relates to an aqueous ink particularly suitable for use in an ink jet recording method, and an ink set, an image forming method and an image forming apparatus using such an aqueous ink.

2. Description of the Related Art

An ink jet recording method is widely used in various fields because of the features that recording can be conducted with a low noise, and high-resolution images can be obtained at high speed by using a recording head having a high-density multi-orifice.

Inks (pigment inks) containing a pigment as a coloring material capable of obtaining recorded articles high in image density and excellent in fastness properties have heretofore been used as inks used in the ink jet recording method. With respect to the pigment inks, inks containing a dispersant such as a polymer for the purpose of stably dispersing a pigment in an ink, improving scratch resistance and highlighter resistance of images and forming a smooth film on a recording medium have been proposed (see Japanese Patent Application Laid-Open No. H08-239610).

On the other hand, the pigment inks involve a problem that an image density is lowered when an image is formed by applying the pigment ink and a color ink so as to overlap each other. To solve such a problem, proposals have been made on a method of preventing an image formed with the pigment ink from lowering the image density thereof upon the formation of the image by applying the pigment ink and the color ink so as to overlap each other (see Japanese Patent Application Laid-Open Nos. 2001-150793, 2001-152059, 2002-154263 and 2004-115549). Specifically, proposals have been made on enhancing the image density by using the pigment ink and a color ink containing a component for aggregating a pigment in the pigment ink.

The present inventors have carried out an investigation on such prior art that the image is formed by applying the pigment ink containing the dispersant and the color ink containing the component for aggregating the pigment so as to overlap each other as described above. As a result, it has been found that when a recording medium, plain paper in particular, is used, the image density of the image formed with the pigment ink is not sufficiently achieved according to the kind of the recording medium. It has also been found that the lowering of the image density is markedly caused when the pigment ink is applied so as to overlap the color ink in particular.

The present inventors infer the reason why the image density is not sufficiently achieved as follows. More specifically, the dispersion state of the pigment in the pigment ink containing the dispersant is relatively stable, and so the tendency of the pigment to aggregate is relatively low. Therefore, the color ink to be used together with such a pigment ink fails to allow an aggregated pigment to be sufficiently present on a recording medium where the color ink contains only the component for aggregating the pigment. It is thus considered that the image density is not sufficiently achieved because a part of the pigment, which has not been aggregated at this time, permeates into the interior (thickness-wise direction of recording medium) of the recording medium.

The present inventors have carried out an investigation on such a problem. As a result, it has been found that the lowering of the image density caused by applying the pigment ink containing the dispersant so as to overlap the color ink can be prevented to some extent by adding the component for aggregating the pigment in excess into the color ink. It has however been found that when a polyvalent metal salt generally used as the component for aggregating the pigment is added in excess into the ink, a problem may occur on the ejection stability of the ink from a recording head in some cases.

Thus, the present inventors have also carried out an investigation with a view toward preventing the lowering of the image density by using a color ink containing the polyvalent metal salt to the same extent as the content of the polyvalent metal salt in a conventional ink. As a result, it has been found that setting the surface tension (static surface tension) of the color ink higher than that of the conventional general ink can prevent the lowering of the image density. It has however been found that when the pigment ink containing the dispersant and such a color ink are applied so as to overlap each other, a problem that the fixing ability of an image formed with the pigment ink is lowered occurs because the surface tension of such a color ink is high, and so the permeability thereof into the recording medium is low.

SUMMARY OF THE INVENTION

Accordingly, it is an object of the present invention to provide an aqueous ink that can provide images excellent in scratch resistance, highlighter resistance and fixing ability without lowering the ejection stability of the ink and can achieve a high image density. Another object of the present invention is to provide an ink set, an image forming method and an image forming apparatus using such an aqueous ink.

The above objects can be achieved by the present invention described below. More specifically, an aqueous ink according to the present invention is an aqueous ink to be used together with a pigment ink containing a pigment and a polymer, wherein the aqueous ink contains a reactive component for destabilizing the dispersion state of the pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

An ink set according to another embodiment of the present invention is an ink set comprising a plurality of inks, wherein the ink set comprises the above-described aqueous ink and the above-described pigment ink.

An image forming method according to a further embodiment of the present invention is an image forming method using a pigment ink containing a pigment and a polymer and at least one aqueous ink to form an image, wherein the aqueous ink is the above-described aqueous ink, the pigment ink is the above-described pigment ink, and the image is formed in such a manner that an image formed with the pigment ink and an image formed with the aqueous ink overlap each other in at least a partial region.

An image forming apparatus according to a still further embodiment of the present invention is an image forming apparatus for forming an image by using a pigment ink containing a pigment and a polymer and at least one aqueous ink, wherein the aqueous ink is the above-described aqueous ink, the pigment ink is the above-described pigment ink, and the apparatus comprises a unit for forming the image in such a manner that an image formed with the pigment ink and an image formed with the aqueous ink overlap each other in at least a partial region.

According to the present invention, there can be provided an aqueous ink that can provide images excellent in scratch resistance, highlighter resistance and fixing ability without lowering the ejection stability of the ink and can achieve a high image density. According to another embodiment of the present invention, there can be provided an ink set, an image forming method and an image forming apparatus using such an aqueous ink.

Further features of the present invention will become apparent from the following description of exemplary embodiments with reference to the attached drawings.

DESCRIPTION OF THE EMBODIMENTS

Figure 1:
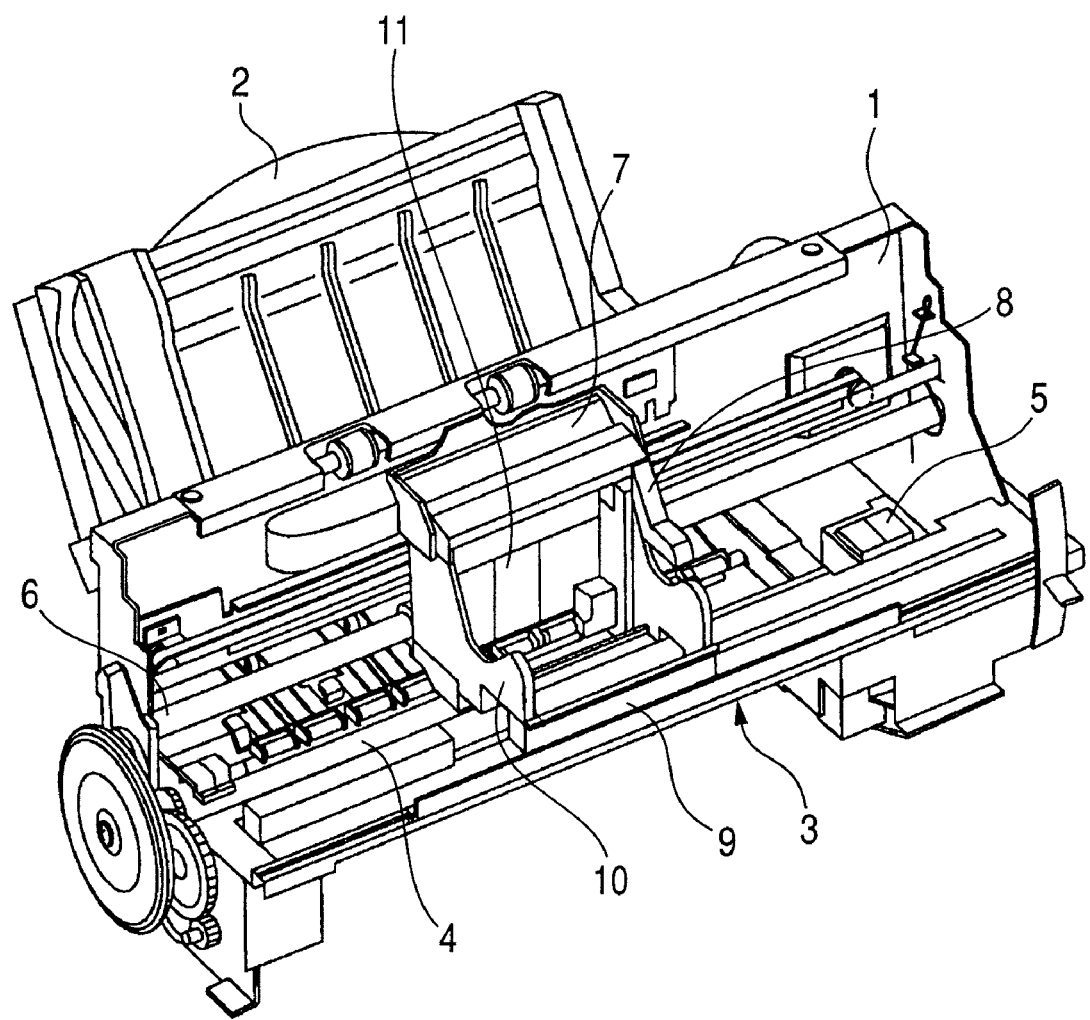
FIG. 1 schematically illustrates an exemplary ink jet recording apparatus.

The present invention will hereinafter be described in detail by preferred embodiments.

The present inventors have found that when a pigment ink containing a dispersant and a color ink containing a component for destabilizing a pigment are applied so as to overlap each other, such problems involved in the prior art as described above can be solved by providing the color ink with the properties of dynamic surface tension, which will be described below. In particular, it has been found that the lowering of an image density caused in the case where the pigment ink and the color ink are applied so as to overlap each other can be markedly inhibited. As a result, it has been found that a high image density can be achieved, and an image excellent in scratch resistance, highlighter resistance and fixing ability can be obtained. The present invention has been made on the basis of such findings and is specifically directed to an aqueous ink having the following constitution.

The aqueous ink according to the present invention is an aqueous ink to be used together with a pigment ink containing a pigment and a polymer, the aqueous ink contains a reactive component for destabilizing the dispersion state of the pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

Incidentally, the maximum bubble pressure method used in the measurement of the dynamic surface tension in the present invention is a method described below. Specifically, the maximum bubble pressure method is a method that a maximum pressure required to release a bubble formed at a tip portion of a probe (capillary) dipped in a liquid to be measured is measured, and a surface tension is found from this maximum pressure. The lifetime (surface age) means a time from a point of time a surface of a new bubble is formed after a bubble has been released from the tip portion to a point of time of a maximum bubble pressure (a point of time the curvature radius of the bubble becomes equal to the radius of the tip portion of the probe) upon the formation of the bubble at the tip portion of the probe in the maximum bubble pressure method. The dynamic surface tension in the present invention is a value measured at 25° C.

In the present invention, an ink containing a pigment and a polymer is called "a pigment ink". The aqueous ink containing the reactive component for destabilizing the dispersion state of the pigment in the pigment ink is called "a reactive ink". An ink containing no reactive component for destabilizing the dispersion state of the pigment in the pigment ink is called "a non-reactive ink". Incidentally, the reactive ink and non-reactive ink may be either color inks or black inks. However, color inks are particularly preferred in the present invention.

In the present invention, methods for applying the respective inks to a recording medium mainly include mainly the following two procedures. The reactive ink is first applied to at least a part of a region to which the pigment ink will be applied, and the pigment ink is then applied to at least a part of a region to which the reactive ink has been applied. Alternatively, the pigment ink is first applied, and the reactive ink is then applied to at least a part of a region to which the pigment ink has been applied. The above-described two methods may be combined with each other. In this case, no particular limitation is imposed on the order of applying the respective inks to a recording medium. However, the method in which the reactive ink is first applied to at least a part of the region to which the pigment ink will be applied, and the pigment ink is then applied to at least a part of the region to which the reactive ink has been applied, to form an image is particularly preferred because an excellent effect can be achieved.

At this time, application amounts of the respective inks are favorably such that the application amount of the reactive ink is from 2/100 to 50/100 with respect to the application amount of the pigment ink. In other words, the application amount of the reactive ink is favorably from 2 or more to 50 or less when the amount of the pigment ink is 100. The reason why the application amounts of the respective inks favorably fall within the above respective ranges is as follows. If the application amount of the reactive ink is too small with respect to the application amount of the pigment ink, the effect of the present invention may not be sufficiently achieved in some cases. If the application amount of the reactive ink is too great with respect to the application amount of the pigment ink on the other hand, new blur may occur in some cases to lower image quality.

When an image is formed in the present invention in such a manner that an image formed with the reactive ink and an image formed with the pigment ink overlap each other in at least a partial region, a sufficient image density is achieved, and an image good in fixing ability can be obtained. In particular, the lowering of the image density markedly caused in the case where an image is formed in such a manner that an image formed with the pigment ink overlaps an image formed with the color ink can be inhibited, and an image good in fixing ability can be obtained. The reason why such effects are achieved is not clearly known. However, as a result of an investigation by the present inventors, the reason is considered to be attributable to the following mechanisms.

[Mechanism of Forming an Image when a Reactive Ink having a Dynamic Surface Tension of 41 mN/m or More at a Lifetime of 30 Milliseconds is Used]

The significance of defining the dynamic surface tension of the reactive ink at a lifetime of 30 milliseconds will be first described below. The present inventors have carried out an investigation as to properties of reactive inks capable of solving the problems of the present invention using various pigment inks and reactive inks as inks applicable to an ink jet recording method. Specifically, the present inventors have carried out an investigation with a view toward controlling the dynamic surface tension properties of inks at lifetimes of 10 milliseconds and 1000 milliseconds, to which attention has heretofore been paid. However, it has been found that no effect can be achieved from the viewpoint of solving the problems of the present invention even when any conditions of the dynamic surface tension, to which attention has heretofore been paid, are used.

Thus, the present inventors have carried out an investigation by assuming an ideal model as a condition an ink on a recording medium can take, reviewing the behavior of such minute droplets that the ejection volume per one ink droplet is, for example, 6 picoliters or less. As a result, the following fact has been found. More specifically, it has been found that a time difference upon contact of the pigment ink and the reactive ink with each other on the recording medium is as extremely short as about 20 milliseconds to 50 milliseconds regardless of the construction of nozzles in a recording head and parameters such as an ejection frequency. Thus, the present inventors have carried out an investigation paying attention to this time difference. As a result, it has been found that the strongest correlation is shown between the image density in a recorded article and the dynamic surface tension of the reactive ink at a lifetime of 30 milliseconds, namely, such a dynamic surface tension is a dominant factor. The present inventors consider that the strong correlation between the dynamic surface tension value of the reactive ink at a lifetime of 30 milliseconds and the image density implies the following fact. It is considered that the behavior of the reactive ink, including permeability into the recording medium, at a point of time 30 milliseconds have elapsed after the reactive ink was applied to the recording medium controls a balance of reactivity between the reactive ink and the pigment ink. This balance of reactivity is considered to determine the image density of an image formed by applying these inks one over the other.

The formation of an image using a reactive ink having the property of the dynamic surface tension at a lifetime of 30 milliseconds as defined in the present invention or a reactive ink not having this property in combination of a pigment ink will be considered below. Incidentally, in the following consideration, it is assumed that the permeability of the pigment ink into a recording medium is made relatively small for improving character quality. In other words, it is assumed that the (static) surface tensions of the pigment ink and the color ink are made relatively great and small, respectively.

(1) Case where a reactive ink having a dynamic surface tension of 41 mN/m or more at a lifetime of 30 milliseconds and containing a reactive component and a pigment ink are used:

When the reactive ink is first applied to a recording medium, the reactive ink covers the recording medium. The pigment ink is then applied so as to overlap the reactive ink. At this time, the reactive ink having a dynamic surface tension of 41 mN/m or more at a lifetime of 30 milliseconds does not immediately permeate into the recording medium because of its high surface tension and exists as a liquid state on the surface of the recording medium. In such a manner, the reactive ink comes into contact with the pigment ink under liquid state on the surface of the recording medium. Therefore, the pigment ink and the reactive ink are quickly mixed with each other at an interface between them to create a state of being liable to become uniform. Aggregation of a pigment is caused to rapidly and uniformly progress by the action of the reactive component in the reactive ink, so that the pigment comes to exist with a uniform distribution in the vicinity of the surface of the recording medium. As a result, uniformity of an image and an image density can be improved.

(2) Case where a reactive ink having a dynamic surface tension less than 41 mN/m at a lifetime of 30 milliseconds and containing a reactive component and a pigment ink are used:

When the reactive ink is first applied to a recording medium, the reactive ink covers the recording medium. The pigment ink is then applied so as to overlap the reactive ink. At this time, the reactive ink having a dynamic surface tension less than 41 mN/m at a lifetime of 30 milliseconds starts to permeate into the recording medium because of its low surface tension before the pigment ink is applied to the recording medium. Therefore, the proportion of the reactive ink and the pigment ink which come into contact with each other under liquid state on the surface of the recording medium becomes relatively low. A part of a pigment, which has not been aggregated, permeates into the interior (thickness-wise direction of recording medium) of the recording medium, so that the proportion of the aggregated pigment existing in the vicinity of the surface of the recording medium becomes relatively low. As a result, a sufficient image density may not be achieved in some cases.

[Mechanism of Forming an Image when a Reactive Ink having a Dynamic Surface Tension of from 28 mN/m or More to 38 mN/m or Less at a Lifetime of 500 Milliseconds is Used]

As described above, it is necessary in the present invention that the reactive ink contains a reactive component for destabilizing the dispersion state of a pigment, and the dynamic surface tension of the reactive ink at a lifetime of 30 milliseconds by the maximum bubble pressure method is 41 mN/m or more. In addition, the reactive ink according to the present invention is required to have the property of dynamic surface tension at a lifetime of 500 milliseconds, which will be described below for the purpose of improving the fixing ability of an image and inhibiting the ink from striking through a recording medium to a back surface thereof (strike through).

The significance of defining the dynamic surface tension of the reactive ink at a lifetime of 500 milliseconds will be first described below. The present inventors have carried out an investigation as to properties of reactive inks capable of solving the problems of the present invention using various pigment inks and reactive inks as inks applicable to an ink jet recording method. As a result, it has been found that the strongest correlation is shown between fixing ability in the case where plain paper is used as recording medium in particular and the dynamic surface tension of the reactive ink at a lifetime of 500 milliseconds, namely, such a dynamic surface tension is a dominant factor. The present inventors consider that the strong correlation between the dynamic surface tension value of the reactive ink at a lifetime of 500 milliseconds and the fixing ability implies the following fact. More specifically, the time period required from the time the reactive ink is applied to a recording medium up to the time the pigment ink is applied to the recording medium and a mixed liquid obtained by bringing the pigment ink and the reactive ink into contact with each other on the recording medium completes permeation into the recording medium is several hundreds milliseconds. At this time, the dynamic surface tension of the reactive ink at a lifetime of 500 milliseconds is considered to greatly affect the rate of permeation of the mixed liquid into the recording medium. A balance between the rate of permeation of the mixed liquid into the recording medium and aggregation of a pigment is considered to determine the fixing ability of an image formed by applying these inks one over the other.

(1) Case where a reactive ink having a dynamic surface tension of more than 38 mN/m at a lifetime of 500 milliseconds containing a reactive component and a pigment ink are used:

When the reactive ink is first applied to a recording medium, the reactive ink covers the recording medium. The pigment ink is then applied so as to overlap the reactive ink. At this time, in the case where the surface tension of the reactive ink applied to the recording medium is kept high, i.e., the reactive ink having a dynamic surface tension of more than 38 mN/m at a lifetime of 500 milliseconds, the permeability into the recording medium is small. Therefore, even after the pigment ink applied to the recording medium after the application of the reactive ink is mixed with the reactive ink on the surface of the recording medium, liquid components in the inks are left on the surface of the recording medium. In other words, the permeation of the liquid components into the recording medium is not caused to rapidly progress. However, aggregation of a pigment by the action of the reactive component in the reactive ink is caused to progress, so that the aggregated pigment and the liquid components in the inks come to exist on the surface of the recording medium. As a result, the fixing ability of an image after recording, in particular just after recording, may be lowered in some cases.

(2) Case where a reactive ink having a dynamic surface tension of from 28 mN/m or more to 38 mN/m or less at a lifetime of 500 milliseconds containing a reactive component and a pigment ink are used:

When the reactive ink is first applied to a recording medium, the reactive ink covers the recording medium. The pigment ink is then applied so as to overlap the reactive ink. At this time, the reactive inks having a dynamic surface tension of from 28 mN/m or more to 38 mN/m or less at a lifetime of 500 milliseconds has moderate permeability into the recording medium. Therefore, after the pigment ink applied to the recording medium after the application of the reactive ink is mixed with the reactive ink on the surface of the recording medium, liquid components in the inks rapidly permeate into the recording medium. At the same time, aggregation of a pigment by the action of the reactive component in the reactive ink is caused to progress, so that the aggregated pigment comes to exist on the surface of the recording medium in such a condition where solid-liquid separation has been advanced. As a result, the fixing ability of an image after recording, in particular just after recording, can be improved. If the dynamic surface tension of the reactive ink at a lifetime of 500 milliseconds is too low, specifically less than 28 mN/m, however, the permeability of such an ink into the recording medium becomes too great. As a result, in the case where plain paper is used as recording medium in particular, the ink easily permeates into the interior (thickness-wise direction of the recording medium) of the recording medium, so that the ink may strike through the back surface thereof, i.e., strike through may occur in some cases. The dynamic surface tension of the reactive ink at a lifetime of 500 milliseconds is thus required to be 28 mN/m or more.

Incidentally, the effects of the present invention can be achieved irrespective of the kind of recording medium so far as the recording medium is a recording medium having permeability, for example, glossy paper, coated paper or plain paper. The plain paper having particularly high permeability is particularly favorably used because excellent effects can be achieved.

[Upper Limit of Dynamic Surface Tension at a Lifetime of 30 Milliseconds]

If the dynamic surface tension of the reactive ink at a lifetime of 30 milliseconds is too high, specifically exceeds 51 mN/m, such an ink takes a long time to permeate into the recording medium. As a result, the ink spreads on the surface of the recording medium, so that the quality of characters formed with the reactive ink may be lowered in some cases. Therefore, the dynamic surface tension of the reactive ink at a lifetime of 30 milliseconds is favorably 51 mN/m or less.

<Ink>

With respect to the respective inks according to the present invention, the features of the inks and respective components making up the inks will hereinafter be described.

[Reactive Ink]

The reactive ink requires to contain a reactive component for destabilizing the dispersion state of a pigment in a pigment ink and have the following dynamic surface tension properties. The reactive ink requires to have a dynamic surface tension of 41 mN/m or more at a lifetime of 30 milliseconds and a dynamic surface tension of from 28 mN/m or more to 38 mN/m or less at a lifetime of 500 milliseconds. As described above, the dynamic surface tension of the reactive ink at a lifetime of 30 milliseconds is favorably 51 mN/m or less.

In the present invention, the destabilization of the pigment in the pigment ink is defined as satisfying the following mode (1) or (2). A mixed ink is first prepared by mixing a reactive ink and a pigment ink at equal volumes. At this time, the destabilization is defined as satisfying (1) a mode that aggregation or precipitation of the pigment in the mixed ink occurs or (2) a mode that the viscosity C of the mixed ink satisfies the following relationship: $C>((A+B)/2)\times 1.2$, wherein A is the viscosity of the reactive ink, and B is the viscosity of the pigment ink. Incidentally, the viscosity is a value measured at ordinary temperature (25° C.), and the unit thereof is mPa·s. Specifically, the mode (1) or (2) may be, for example, the following mode (A), (B), (C) or (D).

Mode (A): The pigment or dispersant in the pigment ink has an anionic group, and the reactive ink contains a cationic component as the reactive component. In this case, when the pigment ink and the reactive ink are mixed, the cationic component in the reactive ink reacts with the anionic group of the pigment or dispersant in the pigment ink to destabilize the dispersion state of the pigment, so that aggregation or precipitation of the pigment occurs, or the viscosity of the mixed ink increases.

As the cationic component, may be used, for example, a polyvalent metal. Specific ways for containing the polyvalent metal in the ink include, for example, to contain a polyvalent metal salt in the ink. Incidentally, the polyvalent metal salt exists as a polyvalent metal ion and an anion in the ink. In the present invention, however, this case is represented as containing the polyvalent metal in the ink. Specific favorable examples of the polyvalent metal ion include $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$. Specific examples of the anion include inorganic acid ions such as $NO_3^-$, $SO_4^{2-}$ and $Cl^-$, and organic acid ions such as $CH_3COO^-$. In the present invention, $Mg^{2+}$ among the above-mentioned polyvalent metal ions is particularly favorably used from the viewpoints of storage stability of the resulting reactive ink and of the requirement that members (for example, an ink flow path making up an ink jet recording apparatus), with which the reactive ink comes into contact, are not dissolved. $NO_3^-$, $SO_4^{2-}$, $Cl^-$ and $CH_3COO^-$ among the above-mentioned anions are favorably used from the viewpoint of solubility, and $NO_3^-$, $SO_4^{2-}$ and $CH_3COO^-$ are particularly favorably used because such anions are excellent in solubility in water. The content (% by mass) of the polyvalent metal in the reactive ink is favorably from 0.01% by mass or more to 10.0% by mass or less based on the total mass of the ink. When contained in the form of the polyvalent metal salt, the content (% by mass) of the polyvalent metal salt in the reactive ink is favorably from 0.1% by mass or more to 20.0% by mass or less, more favorably from 0.2% by mass or more to 15.0% by mass or less based on the total mass of the ink.

Mode (B): The pigment or dispersant in the pigment ink has a cationic group, and the reactive ink contains an anionic component as the reactive component. In this case, when the pigment ink and the reactive ink are mixed, the anionic component in the reactive ink reacts with the cationic group of the pigment or dispersant to destabilize the dispersion state of the pigment, so that aggregation or precipitation of the pigment occurs, or the viscosity of the mixed ink increases.

Mode (C): The pigment in the pigment ink is stably dispersed at a pH of from 3 to 7, and the pH of the reactive ink is controlled to 8 to 11. In this case, when the pigment ink and the reactive ink are mixed, the pH of the pigment ink is raised to destabilize the dispersion state of the pigment, so that aggregation or precipitation of the pigment occurs, or the viscosity of the mixed ink increases.

Mode (D): The pigment in the pigment ink is stably dispersed at a pH of from 7 to 11, and the pH of the reactive ink is controlled to 3 to 6. In this case, when the pigment ink and the reactive ink are mixed, the pH of the pigment ink is lowered to destabilize the dispersion state of the pigment, so that aggregation or precipitation of the pigment occurs, or the viscosity of the mixed ink increases.

(Coloring Material)

The effects of the present invention can be achieved even when the reactive ink is either an ink containing no coloring material or an ink containing a coloring material. In the case of the reactive ink containing the coloring material, the coloring material in the reactive ink may be suitably selected from either publicly known coloring materials or newly synthesized coloring materials. The content (% by mass) of the coloring material in the reactive ink is favorably from 0.05% by mass or more to 15.0% by mass or less based on the total mass of the ink.

Coloring materials usable in the reactive ink are mentioned by color tones below. Needless to say, the present invention is not limited to these coloring materials.

(Yellow Coloring Material)

C.I. Direct Yellow: 8, 11, 12, 27, 28, 33, 39, 44, 50, 58, 85, 86, 87, 88, 89, 98, 100, 110, 132 and 173; and C.I. Acid Yellow: 1, 3, 7, 11, 17, 23, 25, 29, 36, 38, 40, 42, 44, 76, 98 and 99.

(Magenta Coloring Material)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229 and 230; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265 and 289; C.I. Food Red: 87, 92 and 94; and C.I. Direct Violet: 107.

(Cyan Coloring Material)

C.I. Direct Blue: 1, 15, 22, 25, 41, 76, 77, 80, 86, 90, 98, 106, 108, 120, 158, 163, 168, 199, 226 and 307; and C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221 and 244.

(Black Coloring Material)

C.I. Direct Black: 17, 19, 22, 31, 32, 51, 62, 71, 74, 112, 113, 154, 168 and 195; C.I. Acid Black: 2, 48, 51, 52, 110, 115 and 156; and C.I. Food Black: 1 and 2.

(Other Coloring Materials)

In the present invention, the so-called special color inks of red, green and blue may be used together with the inks of the above-mentioned color tones as needed. Specific examples of coloring material usable in these inks are mentioned below. Needless to say, the present invention is not limited to these coloring materials.

C.I. Acid. Orange: 7, 8, 10, 12, 24, 33, 56, 67, 74, 88, 94, 116 and 142; C.I. Acid Red: 111, 114, 266 and 374; C.I. Direct Orange: 26, 29, 34, 39, 57, 102 and 118; C.I. Food Orange: 3; C.I. Reactive Orange: 1, 4, 5, 7, 12, 13, 14, 15, 16, 20, 29, 30, 84 and 107; C.I. Disperse Orange: 1, 3, 11, 13, 20, 25, 29, 30, 31, 32, 47, 55 and 56; C.I. Acid Green: 1, 3, 5, 6, 9, 12, 15, 16, 19, 21, 25, 28, 81 and 84; C.I. Direct Green: 26, 59 and 67; C.I. Food Green: 3; C.I. Reactive Green: 5, 6, 12, 19 and 21; C.I. Disperse Green: 6 and 9; C.I. Acid Blue: 62, 80, 83, 90, 104, 112, 113, 142, 203, 204, 221 and 244; C.I. Reactive Blue: 49; C.I. Acid Violet: 17, 19, 48, 49, 54 and 129; C.I. Direct Violet: 9, 35, 47, 51, 66, 93, 95 and 99; C.I. Reactive Violet: 1, 2, 4, 5, 6, 8, 9, 22, 34 and 36; and C.I. Disperse Violet: 1, 4, 8, 23, 26, 28, 31, 33, 35, 38, 48 and 56.

(Surfactant)

The reactive ink favorably contains a surfactant as a penetrant. The prepared ink requires to be adjusted so as to have the above-described change in dynamic surface tension. As such a surfactant, may be used, for example, the following surfactants. The surfactants mentioned below may be used either singly or in any combination thereof.

(Nonionic Surfactant)

Polyoxyethylene alkyl ethers, polyoxyethylene fatty acid esters, polyoxyethylene alkyl phenyl ethers, polyoxyethylene/polyoxypropylene block copolymers, fatty acid diethanolamides and acetylene glycol compounds.

(Anionic Surfactant)

Polyoxyethylene alkyl ether sulfate salts, polyoxyethylene alkyl ether sulfonates, polyoxyethylene alkyl phenyl ether sulfate salts, polyoxyethylene alkyl phenyl ether sulfonates, alpha-sulfo-fatty acid ester salts, alkylbenzene sulfonates, alkylphenolsulfonic acid salts, alkylnaphthalenesulfonic acid salts, alkyltetralinsulfonic acid salts and dialkylsulfo-succinic acid salts.

(Cationic Surfactant)

Alkyltrimethylammonium salts and dialkyldimethyl-ammonium chlorides.

(Amphoteric Surfactant)

Alkylcarboxybetaines.

(Other Surfactants)

Fluorine-containing surfactants and silicone surfactants.

In the present invention, the reactive ink requires to be adjusted so as to have the above-described dynamic surface tension properties. To adjust the reactive ink so as to have the above-described dynamic surface tension properties can be achieved by using one or more of the surfactants mentioned above to adjust the dynamic surface tension of the ink.

In the present invention, it is particularly favorable to adjust the dynamic surface tension of the reactive ink using a nonionic surfactant, favorably a polyoxyethylene alkyl ether, among the above-mentioned surfactants. In the case where such a surfactant is used, the content (% by mass) of the surfactant in the reactive ink is favorably from 0.10% by mass or more to 3.0% by mass or less, more favorably from 0.5% by mass or more to 2.0% by mass or less based on the total mass of the ink. If the content is less than 0.10% by mass, wetting of a member making up an ink flow path of an ink jet recording apparatus is not sufficiently achieved, so that ejection stability may be lowered in some cases. If the content exceeds 3.0% by mass, the content of the surfactant becomes too high when water in such an ink evaporates in the vicinity of an ejection orifice of the ink jet recording apparatus, so that the viscosity of the ink may locally increase in some cases to lower the ejection stability of the ink.

In the present invention, the polyoxyethylene alkyl ether is particularly favorably at least one selected from surfactants represented by the following general formula (1) and surfactants represented by the following general formula (2). An ink containing these surfactants causes a large change of dynamic surface tension with change of the lifetime, so that such an ink is particularly preferred for achieving both image density and fixing ability.

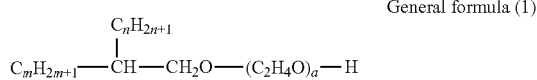

General formula (1)

In the general formula (1), a, m and n each independently represent an integer of 1 or more, and m+n represents an integer of from 14 to 20.

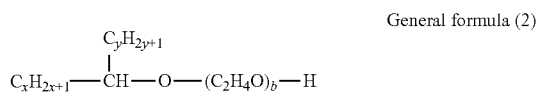

General formula (2)

In the general formula (2), b, x and y each independently represent an integer of 1 or more, and x+y represents an integer of from 12 to 21.

When a surfactant represented by the general formula (1) or the general formula (2) is used, the content (% by mass) of the surfactant is favorably from 0.30% by mass or more to 2.0% by mass or less, more favorably from 0.75% by mass or more to 1.5% by mass or less based on the total mass of the ink. The content is controlled within the above range, whereby excellent image density and fixing ability can be simultaneously achieved, and excellent ejection stability can be achieved. If the content is less than 0.30% by mass, the permeation of such an ink into a recording medium becomes slow, so that the ink may spread on the surface of the recording medium in some cases to lower the fixing ability. If the content exceeds 2.0% by mass on the other hand, the permeation of such an ink into a recording medium becomes fast, so that a sufficient image density may not be achieved in some cases.

In the present invention, the HLB value of the surfactant as determined by the Griffin method is particularly favorably from 9.0 or more to 16.5 or less. The Griffin method is a method for calculating an HLB value according to the following equation (1) based on a formula weight of a hydrophilic group and a molecular weight of a surfactant.

$HLB = 20 \times$(formula weight of the hydrophilic group of surfactant)/(molecular weight of surfactant)    (1).

If the HLB value is less than 9.0, a state that such a surfactant has been dissolved in an ink may not be retained in some cases when the ink is stored because of its too low hydrophilicity. If the HLB value is more than 16.5 on the other hand, it may be difficult in some cases to lower the dynamic surface tension of the resulting ink at a lifetime of 500 milliseconds because the hydrophilicity of such a surfactant is too high.

(Aqueous Medium)

The reactive ink favorably contains an aqueous medium that is a mixed solvent of water and a water-soluble organic compound. Any water-soluble organic compound may be used in the inks according to the present invention so far as the inks are adjusted so as to have the above-described dynamic surface tension properties. The content (% by mass) of the water-soluble organic compound in the ink is favorably from 1.0% by mass or more to 50.0% by mass or less, more favorably from 3.0% by mass or more to 40.0% by mass or less based on the total mass of the ink.

As the water-soluble organic compound, may be specifically used, for example, the following compounds:

alcohols having 1 to 6 carbon atoms, such as ethanol, isopropanol, 2-propanol, n-butanol, isobutanol, pentanol and hexanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such as tetrahydrofuran and dioxane; alkylene glycols such as ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as glycerol, 1,3-butanediol, 1,2- or 1,5-pentanediol, 1,2- or 1,6-hexanediol, 2-methyl-1,3-propanediol and 1,2,6-hexanetriol; alkyl ethers of polyhydric alcohols, such as ethylene glycol monomethyl (or ethyl)ether, diethylene glycol monomethyl (or ethyl)ether and triethylene glycol monoethyl (or butyl)ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide and thiodiglycol.

Among these compounds, alcohols such as ethanol, 2-propanol, 1,2-pentanediol, 1,5-pentanediol, 1,2-hexanediol and 1,6-hexanediol are favorably contained as the water-soluble organic compounds.

As water, is favorably used deionized water (ion-exchanged water). The content (% by mass) of water in the reactive ink is favorably from 50.0% by mass or more to 95.0% by mass or less based on the total mass of the ink for the purpose of providing the ink as an ink having a viscosity proper for being stably ejected and inhibited from clogging at an orifice.

(Other Components)

In addition to the above-described components, the reactive ink may contain a moisture-retaining compound such as urea, a urea derivative, trimethylolpropane or trimethylolethane for the purpose of maintaining the moisture retention of the ink. The content (% by mass) of the moisture-retaining compound in the reactive ink is favorably from 0.1% by mass or more to 20% by mass or less, more preferably from 3.0% by mass or more to 10.0% by mass or less based on the total mass of the ink. In addition to the above-described components, the reactive ink may contain various compounds, as needed for the purpose of providing the reactive ink with desired physical property values. Specifically, for example, various additives such as a pH adjustor, a rust preventive, a preservative, a mildewproofing agent, an antioxidant, an anti-reducing agent, an evaporation accelerator, a chelating agent and a water-soluble polymer may be contained.

(Physical Properties of Ink)

In the present invention, the static surface tension of the reactive ink is favorably from 20 mN/m or more to 40 mN/m or less, more favorably from 25 mN/m or more to 35 mN/m or less.

[Pigment Ink]

(Coloring Material)

In the present invention, a pigment used in the pigment ink requires to be a polymer dispersion pigment using a polymer as a dispersant. In the present invention, the polymer dispersion pigment is a pigment dispersed by a polymer (dispersant). The pigment ink containing the polymer dispersion pigment is used together with the above-described reactive ink, whereby images having high-level fastness properties, which have been required in recent years, i.e., excellent scratch resistance and highlighter resistance can be provided. The present inventors consider a reason for this to be as follows. The reactive ink having the above-described dynamic surface tension properties and the pigment ink containing the polymer dispersion pigment are used in combination, whereby these inks come into contact with each other under liquid state on the surface of the recording medium to cause a uniform reaction. At this time, the polymer also comes to exist with a uniform distribution in the vicinity of the surface of the recording medium like the pigment, so that excellent scratch resistance and highlighter resistance are achieved.

In the pigment ink, such a dye as mentioned as the coloring material for the reactive ink may also be used in addition to the pigment for purposes of color adjustment. The content (% by mass) of the pigment in the pigment ink is favorably from 0.1% by mass or more to 15.0% by mass or less, more favorably 1.0% by mass or more to 10.0% by mass or less based on the total mass of the ink.

(Carbon Black)

As a pigment used in a black pigment ink, is mentioned carbon black. Examples of usable carbon black include furnace black, lamp black, acetylene black and channel black. Specifically, for example, the following commercially available carbon black products may be used. These pigments may be used either singly or in any combination thereof. Needless to say, the present invention is not limited to these products.

Raven: 7000, 5750, 5250, 5000 ULTRA, 3500, 2000, 1500, 1250, 1200, 1190 ULTRA-II, 1170 and 1255 (all, products of Columbian Carbon Co.); Black Pearls L, Regal: 400R, 300R and 660R, Mogul L, Monarch: 700, 800, 880, 900, 1000, 1100, 1300, 1400 and 2000, and Valcan XC-72R (all, products of CABOT CO.); Color Black: FW1, FW2, FW2V, FW18, FW200, S150, S160 and S170, Printex: 35, U, V, 140U and 140V, and Special Black: 6, 5, 4A and 4 (all, products of Degussa AG); and No. 25, No. 33, No. 40, No. 47, No. 52, No. 900, No. 2300, MCF-88, MA600, MA7, MA8 and MA100 (all, products of MITSUBISHI CHEMICAL CORPORATION).

Carbon black newly prepared for the present invention may also be used. Further, magnetic fine particles such as magnetite and ferrite, and titanium black may also be used without being limited to carbon black.

(Organic Pigment)

Pigments used in color pigment inks are organic pigments. As the organic pigments, may be used the following pigments. These pigments may be used either singly or in any combination thereof. Needless to say, the present invention is not limited to these pigments.

Water-insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are indicated by COLOR INDEX (C.I.) numbers, the following pigments may be specifically used.

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59 and 61; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:3, 15:1, 15:4, 15:6, 22, 60 and 64; C.I. Pigment Green: 7 and 36; and C.I. Pigment Brown 23, 25 and 26.

(Dispersant)

As the dispersant, may be used any polymer so far as the polymer is water-soluble. In the present invention, a polymer dispersant capable of dispersing the pigment in the aqueous medium by an action of a hydrophilic group is particularly favorably used. The dispersant favorably has a weight average molecular weight of from 1,000 or more to 30,000 or less, more favorably from 3,000 or more to 15,000 or less. The content (% by mass) of the dispersant in the pigment ink is favorably from 0.1% by mass or more to 10.0% by mass or less based on the total mass of the ink. A ratio of the content of the pigment to the content of the dispersant (P/B ratio=content of pigment/content of dispersant) in the pigment ink is favorably from 0.02 or more to 150 or less.

As the dispersant, may be specifically used the following dispersants:

Styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic acid half ester copolymers, vinylnaphthalene-acrylic acid copolymers, vinylnaphthalene-maleic acid copolymers, styrene-maleic anhydride-maleic acid half ester terpolymers, benzyl methacrylate-methacrylic acid copolymers, and salts of these co- or terpolymers.

(Aqueous Medium)

The pigment ink favorably contains an aqueous medium that is a mixed solvent of water and a water-soluble organic compound. As water, is favorably used deionized water (ion-exchanged water). The content (% by mass) of water in the pigment ink is favorably from 50.0% by mass or more to 95.0% by mass or less based on the total mass of the ink.

The water-soluble organic compound is particularly favorably a compound having an effect of inhibiting drying of the ink. The content (% by mass) of the water-soluble organic compound in the pigment ink is favorably from 3.0% by mass or more to 50.0% by mass or less based on the total mass of the ink. For example, the following water-soluble organic compounds may be specifically used. The following water-soluble organic compounds may be use either singly or in any combination thereof.

Alcohols having 1 to 6 carbon atoms, such as ethanol, isopropanol, 2-propanol, n-butanol, isobutanol, butanol, pentanol and hexanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such as tetrahydrofuran and dioxane; polyhydric alcohols such as glycerol, ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as 1,3-butanediol, 1,2- or 1,5-pentanediol, 1,2- or 1,6-hexanediol, dithioglycol, 2-methyl-1,3-propanediol, 1,2,6-hexanetriol and trimethylolpropane; alkyl ethers of polyhydric alcohols, such as ethylene glycol monomethyl (or ethyl)ether, diethylene glycol monomethyl (or ethyl)ether and triethylene glycol monoethyl (or butyl)ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide.

(Other Components)

In addition to the above-described components, the pigment ink may contain a moisture-retaining compound such as urea, a urea derivative, trimethylolpropane or trimethylolethane for the purpose of maintaining the moisture retention of the ink. The content (% by mass) of the moisture-retaining compound in the pigment ink is favorably from 0.1% by mass or more to 20.0% by mass or less, more preferably from 3.0% by mass or more to 10.0% by mass or less based on the total mass of the ink. In addition to the above-described components, the pigment ink may contain additives such as a surfactant, a pH adjustor, an antifoaming agent, a rust preventive, a preservative, a mildewproofing agent, an antioxidant, an anti-reducing agent, an evaporation accelerator and a chelating agent as needed for the purpose of providing the pigment ink with desired physical property values.

(Physical Properties of Ink)

In the present invention, the static surface tension of the pigment ink is favorably from 30 mN/m or more to 60 mN/m or less, more favorably from 35 mN/m or more to 50 mN/m or less.

[Non-reactive Ink]

In the present invention, a further ink may be used in combination in addition to the above-described reactive ink and pigment ink. The further ink in the present invention includes an ink (non-reactive ink) which does not contain, for example, a polyvalent metal, i.e., does not react with the pigment ink. A coloring material for the non-reactive ink may be suitably selected for use from publicly known coloring materials and newly synthesized coloring materials. Specifically, those usable as the coloring materials for the reactive inks may be used. The content (% by mass) of the coloring material in the non-reactive ink is favorably from 0.05% by mass or more to 15.0% by mass or less based on the total mass of the ink. As an aqueous medium and additives of the non-reactive ink, may be used the same medium and additives as in the above-described reactive ink and pigment ink.

<Ink Set>

The ink set according to the present invention has a plurality of inks, wherein the ink set has the above-described aqueous ink and pigment ink. The ink set may further have at least one of the non-reactive inks described above and any other ink. The ink set in the present invention includes that in the form of an ink cartridge independently storing a plurality of inks or in the form of an ink cartridge integrally formed by combining a plurality of ink storage portions respectively storing a plurality of inks. Incidentally, the ink cartridge may have such a construction that a recording head is additionally integrally formed. The form where the ink cartridge independently storing the plurality of inks is constructed so as to be installed detachably in an ink jet recording apparatus may also be included in the ink set according to the present invention. In any event, it is only necessary for the ink set according to the present invention to be made up in such a manner that at least the reactive ink and the pigment ink can be used in combination, and so the ink set is not limited to the above-described modes and may be any mode.

<Image Forming Method and Image Forming Apparatus>

The image forming method according to the present invention is an image forming method for forming an image using a pigment ink containing a pigment and a polymer and at least one aqueous ink, wherein the above-described pigment ink and the above-described aqueous ink are used as the pigment ink and the aqueous ink, and the image is formed in such a manner that an image formed with the pigment ink and an image formed with the aqueous ink overlap each other in at least a partial region.

The image forming apparatus according to the present invention is an image forming apparatus for forming an image by using a pigment ink containing a pigment and a polymer and at least one aqueous ink, wherein the above-described pigment ink and the above-described aqueous ink are used as the pigment ink and the aqueous ink, and the apparatus has a unit for forming the image in such a manner that an image formed with the pigment ink and an image formed with the aqueous ink overlap each other in at least a partial region.

As an image forming apparatus suitable for use in conducting recording using the above-described reactive ink and pigment ink, an ink jet recording apparatus capable of conducting bi-directional recording will be described with reference to FIG. 1 and FIG. 2.

FIG. 1 schematically illustrates an exemplary ink jet recording apparatus. A chassis 1 is made up of a plurality of plate-like metal members having a predetermined rigidity and forms a skeleton of the ink jet recording apparatus. Into the chassis, are incorporated a feed section 2 for feeding a recording medium, a conveyance section 4 for guiding the recording medium to a predetermined recording position and to a discharge section 3, a recording section for conducting predetermined recording on the recording medium, and a recording head recovery section 5 for conducting a recovery operation for the recording section. The recording section has a carriage 7 supported scannably along a carriage shaft 6, a recording head cartridge 10 detachably mounted on the carriage 7 through a recording head setting lever 8, and a carriage cover 9 for positioning this cartridge to a predetermined position. One end portion of a contact flexible print cable (hereinafter abbreviated as "contact FPC") 11 is connected to another engaging portion of the carriage 7 opposite to the recording head cartridge 10. A contact portion 15 (see FIG. 2) formed on the end portion of the contact FPC 11 comes into electrical contact with a contact portion 15, which is an external signal input terminal provided on the recording head cartridge 10, to conduct transfer of various information and power supply to the recording head cartridge 10.

Upon formation of an image, the carriage 7 arranges the recording head cartridge 10, into which a recording head has been incorporated, at an intended image forming position, to conduct recording on a recording medium by ejecting an ink from the recording head based on the various information received through the contact part 15. Detailedly, a main scan that the carriage 7 is scanned in a row direction along the carriage shaft 6 while conducting recording by the recording head, and a secondary scan that the conveyance section 4 conveys the recording medium in a line direction are alternately repeated, thereby forming the image on the recording medium. At this time, an image forming method that an image is formed by one main scan of the recording head in a unit region of a recording medium is one-pass recording, and an image forming method that this one-pass recording is conducted in either a forward direction or a backward direction of the main scan is one-pass one-direction recording. An image forming method that an image is formed on the unit region of the recording medium by n scans of the recording head is n-pass recording (n is 1 or more). The unit region means one pixel or one band, and the unit region can be preset as various regions as needed. Here, one pixel means one pixel corresponding to resolution, and one band means a region of an image formed by one scan of the recording head. It is particularly favorable from the viewpoint of achieving the effects of the present invention that the image forming method and image forming apparatus are constituted so as to include the one-pass one-direction recording.

Figure 2:
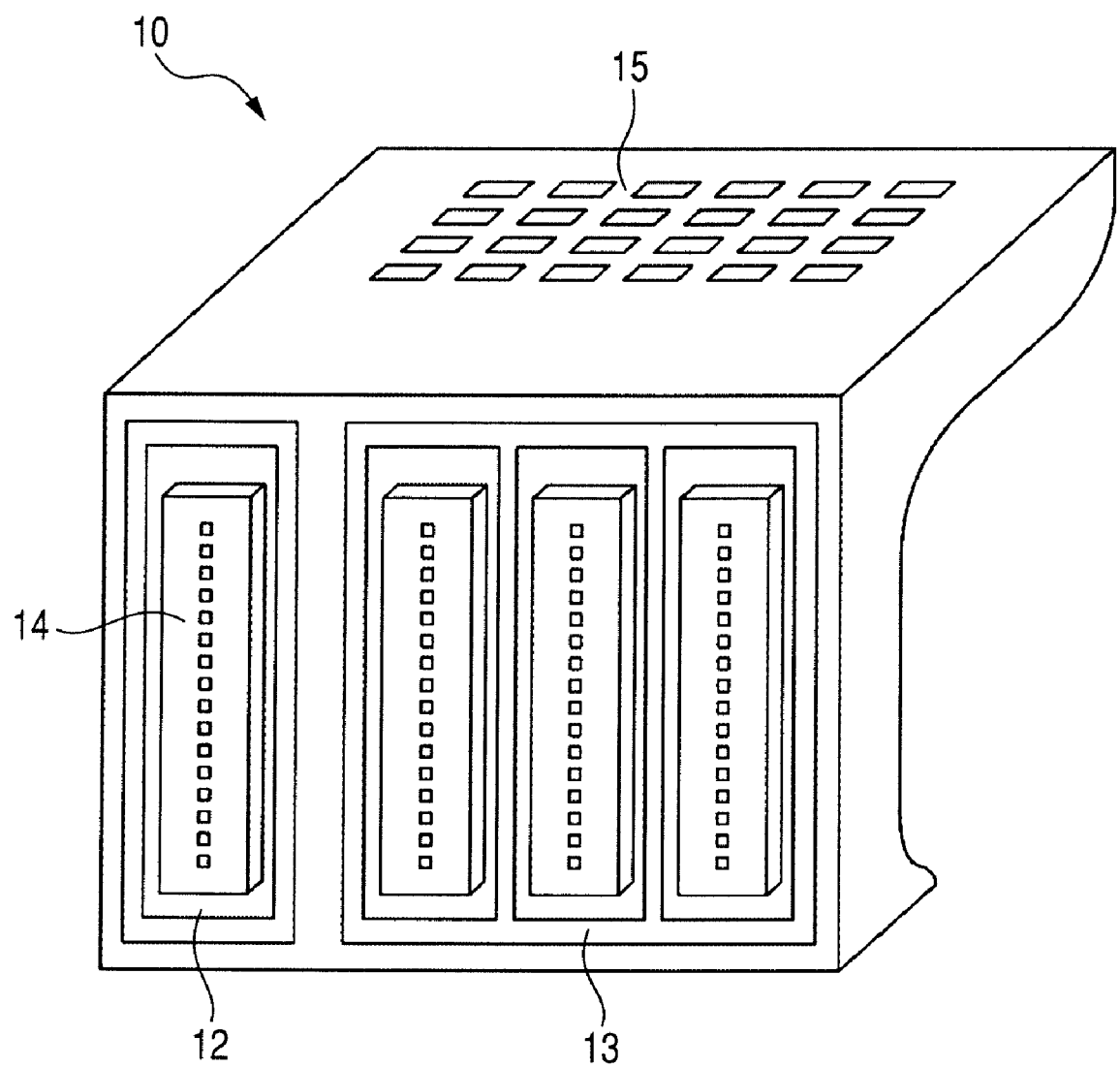
FIG. 2 schematically illustrates an exemplary recording head cartridge.

FIG. 2 schematically illustrates an exemplary recording head cartridge 10. Here, description is given taking, as an example, the case where three color inks and a pigment ink are used. At least one of the three color inks is the reactive ink according to the present invention. The recording head cartridge 10 ejects the inks from a row 14 of ejection orifices in a recording head 12 for pigment ink and rows of ejection orifices set likewise in a recording head 13 for color inks based on recording signals received from the recording apparatus body through the contact portion 15. Incidentally, although the three color inks have been described above, the number of color inks is not limited thereto, and the number of inks and the hues of the inks may be suitably preset so far as at least one of the color inks is the reactive ink according to the present invention.

As the recording head, is mentioned a recording head of a Bubble-Jet (trademark) system that film boiling is caused in an ink by the action of thermal energy to eject the ink. With respect to the typical construction and principle of this head, those using the basic principle disclosed in, for example, U.S. Pat. Nos. 4,723,129 and 4,740,796 are preferred. This system may be applied to any of the so-called On-Demand type and continuous type. However, the On-Demand type is effective because at least one driving signal, which corresponds to recording information and gives a rapid temperature rise exceeding film boiling, is applied to an electrothermal converter, thereby generating thermal energy to cause film boiling on the heat-acting surface of a recording head, so that a bubble can be formed in the ink in response to the driving signal in relation of one to one. The ink is ejected through an ejection orifice by the growth-contraction of this bubble. When this driving signal is applied in the form of a pulse, the growth-contraction of the bubble is suitably conducted in a moment, so that the ejection of the ink, which is excellent in responsiveness in particular, can be achieved. It is thus more favorable to use such pulsed signals.

A recording head of a system that an ink is ejected by the action of mechanical energy is mentioned in addition to the above-described recording head. The recording head of this system is equipped with a nozzle-forming substrate having a plurality of nozzles, piezoelectric materials provided in an opposing relation to the nozzles, pressure-generating devices composed of an electric conductive material and an ink filled around the pressure-generating devices. In this construction, the pressure-generating devices are displaced by application of a voltage to eject the ink.

The ink jet recording apparatus may be either an apparatus that a recording head and an ink cartridge are separately provided or an apparatus that these members are unseparably integrally formed. The ink cartridge may be either a type mounted on a carriage separably from a recording head or unseparably and integrally with the recording head, or a type provided at a fixing site of the ink jet recording apparatus and feeding an ink to a recording head through an ink feeding member such as a tube. When a structure for applying a favorable negative pressure to a recording head is provided in an ink cartridge, the following structure may favorably be used. More specifically, examples thereof include a structure that an absorbing member is arranged in an ink storage portion of the ink cartridge, and a structure having a flexible ink-storing bag and a spring part for applying biasing force to the bag in a direction expanding the internal volume of the bag. The ink jet recording apparatus favorably uses a recording system of such serial type as described above, but may use a line printer type that recording elements are arranged over a range corresponding to the overall width of a recording medium.

EXAMPLES

The present invention will hereinafter be described more specifically by the following Examples, Comparative Examples and Reference Example. However, the present invention is not limited to these examples unless going beyond the gist of the present invention. Incidentally, "%" as will be used below is based on mass unless expressly noted.

<Preparation of Pigment Dispersion Solution>
(Preparation of Pigment Dispersion Solution A)

Ten parts of carbon black having a specific surface area of 210 m$^2$/g and a DBP oil absorption of 74 mL/100 g, 20 parts of a polymer obtained by neutralizing a styrene-acrylic acid copolymer having an acid value of 200 and a weight average molecular weight of 10,000 with a 10% by mass aqueous solution of sodium hydroxide, and 70 parts of water were mixed. This mixture was subjected to a dispersion treatment for 1 hour by means of a sand grinder and then to a centrifugal treatment to remove coarse particles, and the thus treated mixture was filtered under pressure through a microfilter (product of Fuji Photo Film Co., Ltd.) having a pore size of 3.0 μm. A pigment dispersion solution A in which the carbon black had been dispersed by a dispersant (polymer) was obtained according to the above-described process. The pigment concentration and dispersant (polymer) concentration in the pigment dispersion solution A obtained above were 10% by mass and 20% by mass, respectively, the pH of the pigment dispersion solution A was 10.0, and the weight average particle size of the pigment was 120 nm.

(Preparation of Pigment Dispersion Solution B)

Ten parts of C.I. Pigment Blue 15:3 (Fastgen Blue FGF, trade name; product of Dainippon Ink & Chemicals, Incorporated), 20 parts of a polymer obtained by neutralizing a styrene-acrylic acid copolymer having an acid value of 200 and a weight average molecular weight of 10,000 with a 10% by mass aqueous solution of sodium hydroxide, and 70 parts of water were mixed. This mixture was subjected to a dispersion treatment for 1 hour by means of a sand grinder and then to a centrifugal treatment to remove coarse particles, and the thus treated mixture was filtered under pressure through a microfilter (product of Fuji Photo Film Co., Ltd.) having a pore size of 3.0 μm. A pigment dispersion solution B in which the carbon black had been dispersed by a dispersant (polymer) was obtained according to the above-described process. The pigment concentration and dispersant (polymer) concentration in the pigment dispersion solution B obtained above were 8% by mass and 20% by mass, respectively, the pH of the pigment dispersion solution B was 10.0, and the weight average particle size of the pigment was 107 nm.

<HLB Value and Structure of Surfactant>

The HLB values of surfactants were determined. Specifically, the HLB value of the main component in the respective surfactants were calculated according to the Griffin method (the following general formula (1)). The results are shown in Table 1.

$$HLB = 20 \times (\text{formula weight of the hydrophilic group of surfactant})/(\text{molecular weight of surfactant}) \qquad (1).$$

In Table 1, the structure of the main component in each surfactant, and m, n, a and m+n values when the structure of such a surfactant corresponds to the general formula (1), or x, y, b and x+y values when the structure of such a surfactant corresponds to the general formula (2) are shown collectively.

In Table 1, EMULMIN CC-100 and EMULMIN CO-50 are both surfactants produced by Sanyo Chemical Industries, Ltd. EMALEX 1610, EMALEX 1615 and EMALEX 1825 are all surfactants produced by Nihon Emulsion Co., Ltd. NIKKOL BT-7 and NIKKOL BT-12 are both surfactants produced by Nikko Chemicals Co., Ltd. ACETYLENOL E100 is a surfactant produced by Kawaken Fine Chemicals Co., Ltd.

TABLE 1

| | HLB value | Structure of surfactant | General formula (1) | | | | General formula (2) | | | |
|---|---|---|---|---|---|---|---|---|---|---|
| | | | m | n | a | m + n | x | y | b | x + y |
| EMULMIN CC-100 | 12.9 | Polyoxyethylene cetyl ether | — | — | — | — | — | — | — | — |
| EMULMIN CO-50 | 9.0 | Polyoxyethylene oleyl ether | — | — | — | — | — | — | — | — |
| EMALEX 1610 | 12.9 | Polyoxyethylene isocetyl ether | 8 | 6 | 10 | 14 | — | — | — | — |
| EMALEX 1615 | 14.7 | Polyoxyethylene isocetyl ether | 8 | 6 | 15 | 14 | — | — | — | — |
| EMALEX 1825 | 16.1 | Polyoxyethylene isostearyl ether | 9 | 7 | 25 | 16 | — | — | — | — |
| NIKKOL BT-7 | 12.2 | Polyoxyethylene sec-tridecyl ether | — | — | — | — | 6 | 6 | 7 | 12 |
| NIKKOL BT-12 | 14.5 | Polyoxyethylene sec-tridecyl ether | — | — | — | — | 6 | 6 | 12 | 12 |
| ACETYLENOL E-100 | 13.3 | Acetylene glycol ethylene oxide adduct | — | — | — | — | — | — | — | — |

<Preparation of Inks>

After the components shown in Tables 2 to 5 were mixed and sufficiently stirred, the resultant respective mixtures were filtered under pressure through a microfilter (product of Fuji Photo Film Co., Ltd.) having a pore size of 3.0 μm for pigment inks and a microfilter (product of Fuji Photo Film Co., Ltd.) having a pore size of 0.2 μm for the other inks, thereby preparing inks. Incidentally, in Tables 2 to 5, EMULMIN CC-100 and EMULMIN CO-50 are both surfactants produced by Sanyo Chemical Industries, Ltd. EMALEX 1610, EMALEX 1615 and EMALEX 1825 are all surfactants produced by Nihon Emulsion Co., Ltd. NIKKOL BT-7 and NIKKOL BT-12 are both surfactants produced by Nikko Chemicals Co., Ltd. ACETYLENOL E100 is a surfactant produced by Kawaken Fine Chemicals Co., Ltd.

TABLE 2

(Unit: %)

| | Pigment ink | |
|---|---|---|
| | P-1 | P-2 |
| Pigment dispersion solution A | 35.0 | |
| Pigment dispersion solution B | | 40.0 |
| Glycerol | 7.0 | 7.0 |
| Ethylene glycol | 5.0 | 5.0 |
| 2-Pyrrolidone | 5.0 | 5.0 |
| ACETYLENOL E100 | 0.1 | 0.1 |
| Pure water | 47.9 | 42.9 |

TABLE 3

(Unit: %)

| | Reactive ink | | | | | | | | | |
|---|---|---|---|---|---|---|---|---|---|---|
| | R-1 | R-2 | R-3 | R-4 | R-5 | R-6 | R-7 | R-8 | R-9 | R-10 |
| C.I. Direct Blue 199 | 5.5 | 5.5 | 5.5 | 5.5 | 5.5 | 5.5 | 5.5 | 6.0 | 5.5 | 5.5 |
| C.I. Acid Red 289 | | | | | | | | | | |
| C.I. Acid Yellow 23 | | | | | | | | | | |
| Glycerol | 5.0 | 5.0 | 5.0 | 5.0 | 5.0 | 5.0 | 5.0 | 10.0 | 5.0 | 5.0 |
| 1,5-Pentanediol | 10.0 | 10.0 | 10.0 | 10.0 | 10.0 | 10.0 | 10.0 | 5.0 | 10.0 | 10.0 |
| Diethylene glycol | 5.0 | 5.0 | 5.0 | 5.0 | 5.0 | 5.0 | 5.0 | 5.0 | 5.0 | 5.0 |
| 1,2-Hexanediol | | | | | | | | | | |
| EMULMIN CC-100 | 1.0 | | | | | | | | | |
| EMULMIN CO-50 | | 2.0 | | | | | | | | |
| EMALEX 1610 | | | 1.0 | 0.6 | | | | | | |
| EMALEX 1615 | | | | | 1.0 | 0.7 | 0.2 | | | |
| EMALEX 1825 | | | | | | | | 1.0 | | |
| NIKKOL BT-7 | | | | | | | | | 1.0 | |
| NIKKOL BT-12 | | | | | | | | | | 0.8 |
| ACETYLENOL E100 | | | | | | | | | | |
| Magnesium nitrate | 2.5 | 2.5 | 2.5 | 2.5 | 2.5 | 2.5 | 2.5 | 2.5 | 2.5 | 2.5 |
| Magnesium sulfate | | | | | | | | | | |
| Pure water | 71.0 | 70.0 | 71.0 | 71.4 | 71.0 | 71.3 | 71.8 | 69.2 | 71.0 | 71.2 |

TABLE 4

(Unit: %)

| | Reactive ink | | | | | | | | |
|---|---|---|---|---|---|---|---|---|---|
| | R-11 | R-12 | R-13 | R-14 | R-15 | R-16 | R-17 | R-18 | R-19 |
| C.I. Direct Blue 199 | 5.5 | | | | 5.5 | 5.5 | 5.5 | 5.5 | 5.5 |
| C.I. Acid Red 289 | | 3.0 | | | | | | | |
| C.I. Acid Yellow 23 | | | 3.0 | | | | | | |
| Glycerol | 5.0 | 5.0 | 5.0 | 5.0 | 5.0 | 5.0 | 5.0 | 5.0 | |
| 1,5-Pentanediol | 10.0 | 10.0 | 10.0 | 10.0 | 10.0 | 10.0 | 10.0 | 10.0 | 10.0 |
| Diethylene glycol | 5.0 | 5.0 | 5.0 | 5.0 | 5.0 | 5.0 | 5.0 | 5.0 | |
| 1,2-Hexanediol | | | | | | | | | 10.0 |
| EMULMIN CC-100 | | | | | | | | | |
| EMULMIN CO-50 | | | | | | | | | |
| EMALEX 1610 | | 0.6 | 0.6 | 0.6 | | | | 1.0 | |
| EMALEX 1615 | | | | | | | | | |
| EMALEX 1825 | | | | | | | | | |
| NIKKOL BT-7 | | | | | | | | | 1.0 |
| NIKKOL BT-12 | 0.6 | | | | | | 0.1 | | |
| ACETYLENOL E100 | | | | | 2.5 | 0.1 | | | |
| Magnesium nitrate | 2.5 | 2.5 | 2.5 | 2.5 | 2.5 | 2.5 | 2.5 | | |
| Magnesium sulfate | | | | | | | | 2.5 | 2.5 |
| Pure water | 71.4 | 73.9 | 73.9 | 76.9 | 69.5 | 71.9 | 71.9 | 71.0 | 71.0 |

TABLE 5

(Unit: %)

| | Non-reactive ink | |
|---|---|---|
| | NR-1 | NR-2 |
| C.I. Direct Blue 199 | 5.5 | 5.5 |
| Glycerol | 5.0 | 5.0 |
| 1,5-Pentanediol | 10.0 | 10.0 |
| Diethylene glycol | 5.0 | 5.0 |
| ACETYLENOL E100 | 1.0 | |
| EMALEX 1610 | | 1.0 |
| Pure water | 73.5 | 73.5 |

<Reactivity of Mixed Ink Between Reactive Ink or Non-reactive Ink and Pigment Ink>

Twenty grams of the pigment ink and 20 g of the reactive ink or the non-reactive ink shown in Table 6 were mixed and sufficiently stirred to prepare a mixed ink, and the mixed ink was then left at rest for 24 hours. Thereafter, the presence of precipitate and/or aggregate in the mixed ink was visually observed to make evaluation as to reactivity. The evaluation results are shown in Table 6.

TABLE 6

| | | Pigment ink | The other ink[*1] | Presence of precipitate or aggregate |
|---|---|---|---|---|
| No. of mixed ink | 1 | P-1 | R-1 | Observed |
| | 2 | P-1 | R-2 | Observed |
| | 3 | P-1 | R-3 | Observed |
| | 4 | P-1 | R-4 | Observed |
| | 5 | P-1 | R-5 | Observed |
| | 6 | P-1 | R-6 | Observed |
| | 7 | P-1 | R-7 | Observed |
| | 8 | P-1 | R-8 | Observed |
| | 9 | P-1 | R-9 | Observed |
| | 10 | P-1 | R-10 | Observed |
| | 11 | P-1 | R-11 | Observed |
| | 12 | P-1 | R-12 | Observed |
| | 13 | P-1 | R-13 | Observed |
| | 14 | P-1 | R-14 | Observed |
| | 15 | P-1 | R-15 | Observed |
| | 16 | P-1 | R-16 | Observed |
| | 17 | P-1 | R-17 | Observed |
| | 18 | P-1 | R-18 | Observed |
| | 19 | P-1 | R-19 | Observed |
| | 20 | P-2 | R-1 | Observed |
| | 21 | P-2 | R-3 | Observed |
| | 22 | P-2 | R-9 | Observed |
| | 23 | P-2 | R-13 | Observed |
| | 24 | P-1 | NR-1 | Not observed |
| | 25 | P-1 | NR-2 | Not observed |

[*1] Reactive ink or non-reactive ink.

From Table 6, it is understood that in the combination of the pigment ink with the reactive ink, the reactive inks R-1 to R-19 are inks destabilizing the dispersion state of the pigment in the pigment ink.

<Evaluation>

(Measurement of Dynamic Surface Tension)

With respect to the respective reactive inks and non-reactive inks obtained above, the dynamic surface tensions of the inks at (1) a lifetime of 30 milliseconds and (2) a lifetime of 500 milliseconds were measured. An apparatus (Bubble Pressure Tesiometer BP2; manufactured by KRUSS) that measures a dynamic surface tension according to the maximum bubble pressure method was used in the measurement. The evaluation results as to the dynamic surface tension are shown in Table 7.

TABLE 7

| Reactive ink or Non-reactive ink | Dynamic surface tension [mN/m] | |
|---|---|---|
| | (1) Lifetime of 30 ms | (2) Lifetime of 500 ms |
| R-1 | 44 | 37 |
| R-2 | 45 | 38 |
| R-3 | 50 | 35 |
| R-4 | 53 | 35 |
| R-5 | 49 | 35 |
| R-6 | 50 | 35 |
| R-7 | 56 | 39 |
| R-8 | 46 | 38 |
| R-9 | 40 | 31 |
| R-10 | 41 | 36 |
| R-11 | 42 | 36 |
| R-12 | 48 | 33 |
| R-13 | 49 | 33 |
| R-14 | 51 | 33 |
| R-15 | 30 | 28 |
| R-16 | 51 | 46 |
| R-17 | 54 | 41 |
| R-18 | 50 | 35 |
| R-19 | 36 | 27 |
| NR-1 | 36 | 33 |
| NR-2 | 50 | 35 |

(Image Density)

The first application inks and second application inks shown in Table 8 were used in combination to form a solid image by an image forming method that another ink is applied so as to overlap a region to be applied with a pigment ink. An apparatus obtained by modifying an ink jet recording apparatus BJF850 (manufactured by Canon Inc.) was used as an image forming apparatus. Three kinds of plain papers of PPC Paper Office Planner, EN100 and high-color development plain paper Superwhite Paper SW101 (all, products of Canon Inc.) were used as recording media. Incidentally, the inks were applied to each recording medium so as to overlap each other in the order of the first application ink and the second application ink as described in Table 8. The formation of the image was conducted by the one-pass one-direction recording. The application amounts of the inks per 1/600 square inches at this time were controlled to about 28 ng for the pigment ink and about 4.5 ng for another ink.

After the respective images obtained by using the three kinds of recording media were left to stand for one day, their image densities were measured to take an average value thereof as an image density value in the solid image. Incidentally, a spectrophotometer (Spectorolino; manufactured by Gretag Macbeth) was used in the measurement of the image density. The evaluation standard of the image density varies with the case where the image is a black solid image (the pigment ink P-1 is used) and the case where the image is a cyan solid image (the pigment ink P-2 is used), and is as follows. The evaluation results are shown in Table 8.

Evaluation standard in the case of the black solid image:
A: The image density is 1.3 or more;
B: The image density is less than 1.3.
Evaluation standard in the case of the cyan solid image:
A: The image density is 1.1 or more;
B: The image density is less than 1.1.

(Fixing Ability)

The first application inks and second application inks shown in Table 8 were used in combination to form a solid image by an image forming method that another ink is applied so as to overlap a region to be applied with a pigment ink. An apparatus obtained by modifying an ink jet recording apparatus BJF850 (manufactured by Canon Inc.) was used as an image forming apparatus. Three kinds of plain papers of PPC Paper Office Planner, EN100 and high-color development plain paper Superwhite Paper SW101 (all, products of Canon Inc.) were used as recording media. Incidentally, the inks were applied to each recording medium so as to overlap each other in the order of the first application ink and the second application ink as described in Table 8. The formation of the image was conducted by the one-pass one-direction recording. The application amounts of the inks per 1/600 square inches at this time were controlled to about 28 ng for the pigment ink and about 4.5 ng for another ink.

After 10 seconds from the formation of respective solid images using the three kinds of recording media, solid images were rubbed with Silbon paper on which a weight of 40 g/cm$^2$ was placed to visually observe the degree of stain of unrecorded portions, thereby making evaluation as to the fixing ability with the average value thereof. The evaluation standard of the fixing ability is as follows. The evaluation results are shown in Table 8.

A: Stain is scarcely observed on the unrecorded portions of the recording media;
B: Stain is observed on the unrecorded portions of the recording media, but is at a allowable level;
C: Stain is markedly observed on the unrecorded portions of the recording media.

TABLE 8

| | | First application ink | Second application ink | Image density | Fixing ability |
|---|---|---|---|---|---|
| Example | 1 | R-1 | P-1 | A | B |
| | 2 | R-2 | P-1 | A | B |
| | 3 | R-3 | P-1 | A | A |
| | 4 | R-4 | P-1 | A | A |
| | 5 | R-5 | P-1 | A | A |
| | 6 | R-6 | P-1 | A | A |
| | 7 | R-8 | P-1 | A | B |
| | 8 | R-10 | P-1 | A | A |
| | 9 | R-11 | P-1 | A | A |
| | 10 | R-12 | P-1 | A | A |
| | 11 | R-13 | P-1 | A | A |
| | 12 | R-14 | P-1 | A | A |
| | 13 | R-18 | P-1 | A | A |
| | 14 | R-3 | P-2 | A | A |
| | 15 | R-5 | P-2 | A | A |
| | 16 | R-11 | P-2 | A | A |
| Comp. Example | 1 | R-7 | P-1 | A | C |
| | 2 | R-9 | P-1 | B | A |
| | 3 | R-15 | P-1 | B | A |
| | 4 | R-15 | P-2 | B | A |
| | 5 | R-16 | P-1 | A | C |
| | 6 | R-16 | P-2 | A | C |
| | 7 | R-17 | P-1 | A | C |
| | 8 | R-19 | P-1 | B | A |
| | 9 | NR-1 | P-1 | B | B |
| Ref. Example | 1 | NR-2 | P-1 | B | B |

When the portions of the color images formed on the recording media using the reactive ink (R-19) of Comparative Example 8 were visually observed from the their back surfaces, it was found that strike through occurred. On the other hand, no strike through occurred on back surfaces of the portions of the color images formed on the recording media using the reactive inks other than the reactive ink (R-19) or the non-reactive inks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-126630, filed May 11, 2007, and Japanese Patent Application No. 2008-112756, filed Apr. 23, 2008, which are hereby incorporated by reference herein in their entirety.

What is claimed is:

1. An ink set to be applied to a recording medium by an ink jet system, the ink set comprising:
    a pigment ink that includes:
        a pigment; and
        a polymer,
        wherein the pigment is dispersed by the polymer; and
    an aqueous ink that includes:
        a reactive component for destabilizing a dispersion state of the pigment; and
        a surfactant,
        wherein the dynamic surface tension of the aqueous ink at a lifetime of 30 milliseconds is 41 mN/m or more and the dynamic surface tension of the aqueous ink at a lifetime of 500 milliseconds is 28 mN/m to 38 mN/m as determined by a maximum bubble pressure method.

2. An image forming method using the ink set according to claim 1, the method comprising:
    forming an image in such a manner that an image formed with the pigment ink and an image formed with the aqueous ink overlap each other in at least a partial region.

3. An image forming apparatus for forming an image, comprising:
    a pigment ink including a pigment and a polymer, and the pigment is dispersed by the polymer;
    an aqueous ink including a reactive component for destabilizing a dispersion state of the pigment and a surfactant, and the dynamic surface tension of the aqueous ink at a lifetime of 30 milliseconds is 41 mN/m or more and the dynamic surface tension of the aqueous ink at a lifetime of 500 milliseconds is 28 mN/m to 38 mN/m as determined by a maximum bubble pressure method;
    a first ink storage potion for storing the pigment ink;
    a second ink storage portion for storing the aqueous ink;
    an ink-jet recording head for ejecting the pigment ink and the aqueous ink; and
    a unit for forming the image in such a manner that an image formed with the pigment ink and an image formed with the aqueous ink overlap each other in at least a partial region.

4. The ink set according to claim 1, wherein the dynamic surface tension of the aqueous ink at a lifetime of 30 milliseconds determined by the maximum bubble pressure method is 41 mN/m to 51 mN/m.

5. The ink set according to claim 1, wherein the surfactant comprises a polyoxyethylene alkyl ether.

6. The ink set according to claim 5, wherein the polyoxyethylene alkyl ether is at least one selected from surfactants represented by the following general formula (1) and surfactants represented by the following general formula (2):

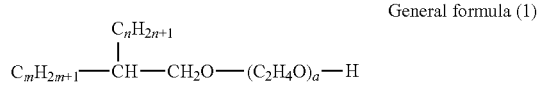

General formula (1)

wherein a, m and n each independently represent an integer of 1 or more, and m+n represents an integer of from 14 to 20;

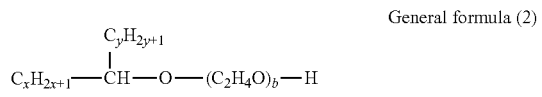

General formula (2)

wherein b, x and y each independently represent an integer of 1 or more, and x+y represents an integer of from 12 to 21.

7. The ink set according to claim 1, wherein the reactive component is a polyvalent metal.

8. The ink set according to claim 1, wherein the content (% by mass) of the surfactant in the aqueous ink is 0.10% by mass or more to 3.0% by mass or less based on the total mass of the ink.

9. The ink set according to claim 1, wherein the HLB value of the surfactant as determined by the Griffin method is from 9.0 or more to 16.5 or less.

* * * * *